US006650434B1

(12) United States Patent
Bruce

(10) Patent No.: US 6,650,434 B1
(45) Date of Patent: Nov. 18, 2003

(54) FILTERED HYPERLINKS IN A PRINTED DOCUMENT

(75) Inventor: Stephen Robert Bruce, Abbottsford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,613

(22) Filed: Dec. 22, 1999

(30) Foreign Application Priority Data

Dec. 23, 1998 (AU) .............................................. PP7897

(51) Int. Cl.[7] ............................................... G06F 13/00

(52) U.S. Cl. ..................... 358/1.18; 358/1.15; 707/513; 707/515

(58) Field of Search ......................... 358/1.1, 1.9, 1.12, 358/1.13, 1.14, 1.15, 1.16, 1.18; 707/512, 513, 514, 515; 709/203, 206, 217, 236, 227

(56) References Cited

U.S. PATENT DOCUMENTS 5,822,539 A * 10/1998 Van Hoff .................... 709/236
5,826,025 A * 10/1998 Gramlich .................... 709/217
6,507,410 B1 * 1/2003 Bruce ........................ 358/1.18

FOREIGN PATENT DOCUMENTS

AU A-83194/98 3/1999 ............. G06F/7/14

* cited by examiner

*Primary Examiner*—Mark Wallerson
(74) *Attorney, Agent, or Firm*—Fitzpatrick, Cella, Harper & Scinto

(57) ABSTRACT

A method of forming a printable document from a database having a plurality of data records is disclosed. The printable document incorporates manual functionality complementing electronic functionality associated with the database. The method comprises the steps of filtering the database using a plurality of filter functions, each filter function having a plurality of filter attributes, the filtering forming, for each filter attribute, a corresponding set of said data records. Creating at least one information page, each information page incorporating at least one data element related to at least one of the data records, there being associated with each data element a corresponding (first) physical indicator selectable by a user of the document to access the corresponding data element. Creating at least one referencing page, each referencing page incorporating, for each the filter function, a first set of (second) physical indicators selectable by the user to access one referencing page corresponding to at least one other of the filter functions, a second set of (third) physical indicators selectable by the user to access information regarding each corresponding attribute of the filter function; and a third set of (fourth) physical indicators configurable in association with the first physical indicators for directly referencing the corresponding the data element. The method concludes by combining the information pages and the referencing pages to form the printable document.

41 Claims, 10 Drawing Sheets

| Attributes | Sample illustration of Sub Attribute 1 for each Attribute |
|---|---|
| Attribute 1<br>Sub Attribute 1<br>Sub Attribute 2<br>Sub Attribute 3 | 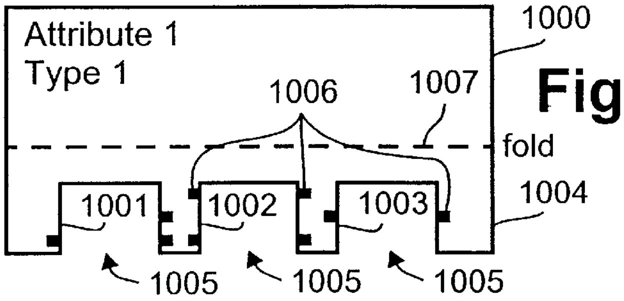 Fig. 1A |
| Attribute 2<br>Sub Attribute 1<br>Sub Attribute 2<br>Sub Attribute 3 | 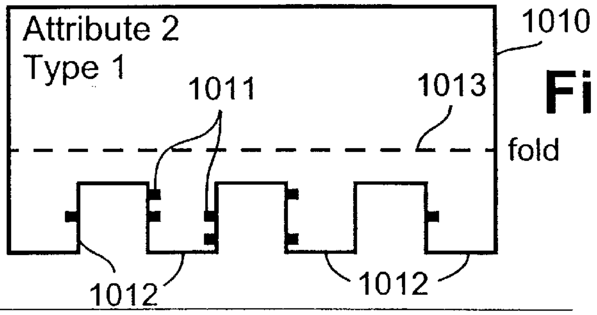 Fig. 1B |
| Attribute 3<br>Sub Attribute 1<br>Sub Attribute 2<br>Sub Attribute 3 | 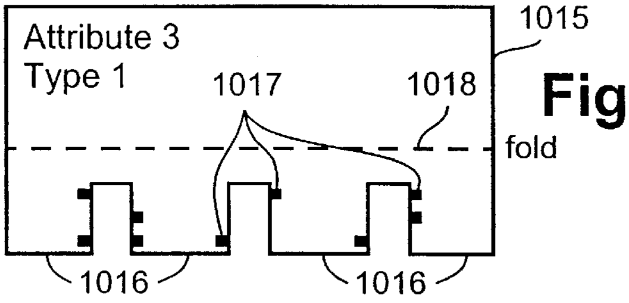 Fig. 1C |
| Overlayed Attributes | 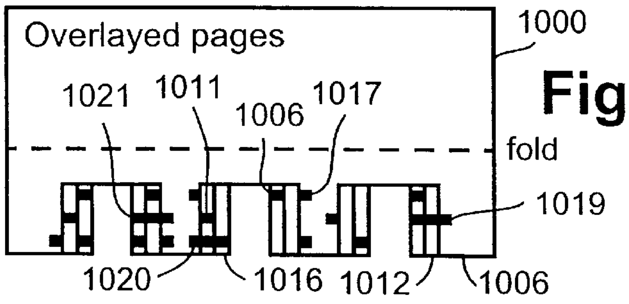 Fig. 1D |
| Folded Attribute | 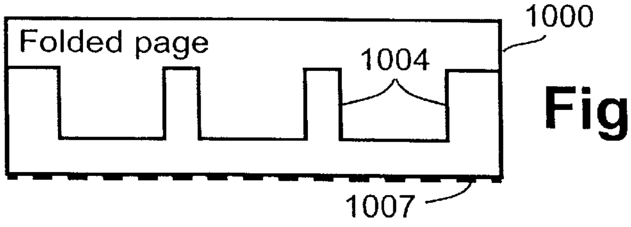 Fig. 1E |

Restaurants

| | | | |
|---|---|---|---|
| Cuisine | Italian | Japanese | Mexican |
| Rating | * | ** | *** |
| Location | West | Central | East |

FILTERED HYPERLINKS IN A PRINTED DOCUMENT

FIELD OF THE INVENTION

The present invention relates to printable documents and, in particular, to the production of a printed document from an electronic document source in such a manner so as to enable a user of the printed document to replicate searching and filtering functions available in the electronic source.

BACKGROUND

For many years, information has been retained electronically in databases for a number of purposes. One is to provide for convenient retrieval of information over a distributed network and another is to enable ease of searching of subject matter within the database. Specifically, electronic databases provide users with the ability to combine search criteria so as to provide a highly filtered search result, thereby minimising the amount of post search analysis (if any) required to be performed by the user.

Difficulties arise however when it is desired for the electronic database to be replicated in a printed document form. Notably, the electronic linking of information becomes lost when the electronic database is reproduced in a material printed form. Further, and more specifically, the ability to search the information within the database is invariably lost upon traditional printing of the database. Because of these issues, information originally sourced in databases invariably remains within such electronic databases. Further, there has been an increasing trend over the past ten or so years for manufacturers of printed documents to scale down the manufacture of printed documents and to release electronic documents in substitution therefor. This substitution provides the added advantages of electronic searching and linking of information within the documents. A commercially successful example of this is the Encyclopedia Britannica which, whilst still available in printed book form, is predominantly marketed in its electronic CD-ROM form due to a substantial cost advantage to the user and also the interactivity available using hyperlinking within the electronic document retained on the CD-ROM.

However, there are instances where electronic databases and the like are undesired, inconvenient, and/or too expensive to justify products being supplied to meet market demand. Invariably, consumers are left with printed documents which lack the functionality of electronic databases.

It is an object of the present invention to substantially overcome, or at least ameliorate, one or more of the above-noted problems

SUMMARY OF THE INVENTION

In accordance with one aspect of the present invention there is disclosed a method of forming a printable document from a database having a plurality of data records, the printable document incorporating manual functionality complementing electronic functionality associated with said database, said method comprising the steps of:

filtering said database using a plurality of filter functions, each said filter function having a plurality of filter attributes, said filtering forming, for each said filter attribute, a corresponding set of said data records;

creating at least one information page, each said information page incorporating at least one data element related to at least one of said data records, there being associated with each said data element a corresponding (first) physical indicator selectable by a user of said document to access the corresponding data element;

creating at least one referencing page, each said referencing page incorporating for each said filter function a first set of (second) physical indicators selectable by said user to access one said referencing page corresponding to at least one other of said filter functions, a second set of (third) physical indicators selectable by said user to access information regarding each corresponding said attribute of said filter function; and a third set of (fourth) physical indicators configurable in association with said first physical indicators for directly referencing the corresponding said data element; and combining said information pages and said referencing pages to form said printable document.

In accordance with another aspect of the present invention there is disclosed a method of forming a transient hyperlink in a printed document, said printed document being formed from applying a plurality of filter functions, each having a plurality of filter attributes, to a plurality of data records to form, for each said attribute, a corresponding said of said data record, said printed document comprising at least one information page, each said information page incorporating at least one data element related to at least one of said plurality of data records, there being associated with each said data clement a corresponding (first) physical indicator selectable by a user of said document to access the corresponding data element;

at least one referencing page, each said referencing page incorporating for each said filter function a first set of (second) physical indicators selectable by said user to access one said referencing page corresponding to at least one other of said filter functions, a second set of (third) physical indicators selectable by said user to access information regarding each corresponding said attribute of said filter function; and a third set of (fourth) physical indicators configurable in association with said first physical indicators for directly referencing the corresponding said data element;

said method comprising the steps of:

(i) selecting one said second physical indicator of a first said referencing page to access a corresponding further said referencing page of said document;

(ii) selecting from said further referencing page a third physical indicator and associating said third physical indicator with an adjacent first physical indicator to identify a corresponding said data record.

Other aspects of the present invention are also disclosed.

BRIEF DESCRIPTION OF THE DRAWINGS

A preferred embodiment of the present invention will now be described with reference to the drawings in which:

FIGS. 1A to 1E illustrate the provision of filtered attributes on printable pages;

DETAILED DESCRIPTION

Figure 2A:
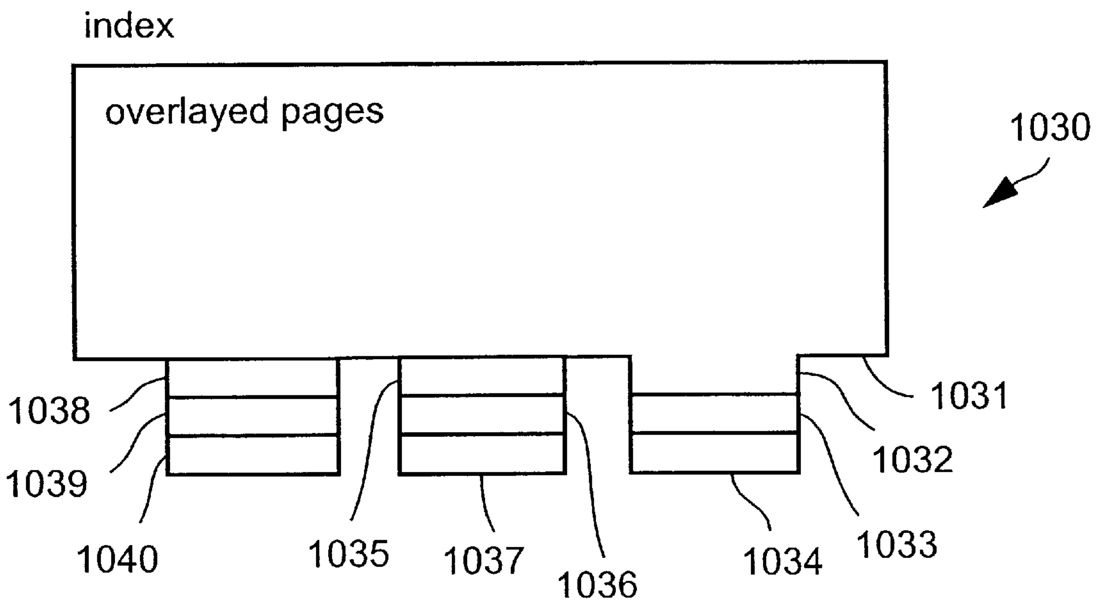
FIGS. 2A and 2B illustrate how data may be configured and the filters of FIGS. 1A to 1B used to select information therefrom.

Australian Patent Publication No. AU-A-83194/98, corresponding to U.S. patent application Ser. No. 09/148,475 (Attorney Refs: CFP0954 MMedia02 432345), the disclosure of each of which is hereby incorporated by cross-reference (hereinafter "the cross-referenced disclosures"), disclose a method and apparatus for the generation of a non-linear printable document which retains, in its final printed form, non-linear links (hyperlinks) present in an electronic document from which the printable document is sourced. In this fashion, the printable document disclosed in the cross-referenced disclosures provides for ease of traversal of that document in a manner complementing the traversal of the electronic document in its electronic form. In this fashion, electronically hyperlinked documents such as those obtained from the World Wide Web and/or advanced desktop publishing/word processing computer applications, can be used to produce printable documents which incorporate physical indicators that allow for the forward and reverse referencing of information within the text of the document. Typically, and according to the cross-referenced disclosures, the indicators can include printable indicators which refer from one portion of text to another, often in combination with physical indicators such as cutouts or tabs which allow for referencing across a number of pages of the printable document. According to the preferred embodiment disclosed in the cross-referenced disclosures, the printable indicators and physical indicators are generated electronically as a consequence of emplacement of the subject matter of the electronic document in a linear form to allow for non-linear physical linking of previously electronically hyperlinked sections of the electronic document.

The present invention relates to an extension to the printable document production arrangement disclosed in the cross-referenced disclosures to allow a further level of functionality, that being the ability to manually sort and/or search information within such a printable document.

The preferred embodiment relies upon the notion of the non-linear information of the electronic source or database to be provided within one or more pages of a printable document in a linear fashion. Those pages then include one or more indicators, either printed and/or physical, which allow for selection and identification of certain information front those information pages. The document is then supplemented by one or more search pages developed along predetermined search criteria and which incorporate their own indicators relating to that criteria and results arising therefrom which allow for identification of certain indicators from the linear information pages. In this fashion, by reviewing the search pages and the indicators associated therewith, a user may then identify a particular destination of information within the information pages.

FIG. 1A shows a first search page 1000 developed according to one embodiment which relates to a first type (Type 1) of a first attribute (Attribute 1). The Attribute may be any primary search criteria and the Type may be any subset of results obtained from that criteria. The search page 1000 incorporates a number of tabs 1001–1004 which may be formed by cutting out three recesses 1005 from the page 1000.

The tabs 1001–1004 are supplemented, where appropriate, by indicators 1006 which each provide a physical reference to information that satisfies Attribute 1 and Type 1. Further, as seen in FIG. 1A, the page 1000 is provided with a fold line 1007 which allows for the tabs 1004 to be folded back onto the body of the page 1000 and thus be unobtrusive when not required and also to be non-visible when the data referenced by Attribute 1, Type 1 is not required for searching purposes.

FIG. 1B shows a similar representation of a further search page 1010 for a second attribute (Attribute 2) and a first type (Type 1) of Attribute 2. Again, indicators 1011 are provided on a number of tabs 1012 to provide for direct referencing of information that meets Attribute 2, Type 1.

FIG. 1C shows a similar representation of a further searching page 1015 having tabs 1016 and indicators 1017. As with page 1000, each of the pages 1010 and 1015 are provided with corresponding fold lines 1013 and 1018.

As will be apparent from FIG. 1D, the tabs 1004, 1012 and 1016 are individually sized in such a manner so that the tabs of the respective pages 1000, 1010 and 1015 may be overlaid as shown in FIG. 1D, so that each of the various indicators 1006, 1011 and 1017 remain visible even though the bulk of only page 1000 remains visible. Significantly, through the different sizing of the tabs 1004, 1012 and 1016, each of the indicators 1006, 1011 and 1017 remain visible allowing identification of that part of the information pages (not seen in FIG. 1D) that meet the individual search criteria. Significantly, and in accordance with the preferred embodiment, the various indicators are able to be viewed in groups to indicate those portions of the information pages that meet more than one, and preferably all of the search criteria. This is seen for example by groups of indicators 1019, 1020 and 1021.

FIG. 1E illustrates the page 1000 where its tabs have been folded along the fold line 1007 to obscure the various indicators 1006 provided thereon.

FIG. 2A shows an arrangement of information pages 1030 provided in an overlaid fashion where a first page attribute may be initially visible and includes a tab 1032 which provides for selection of the page 1031. Also seen are tabs 1033–1040 of respective information pages and which allow for the selection of the corresponding pages.

Figure 2B:
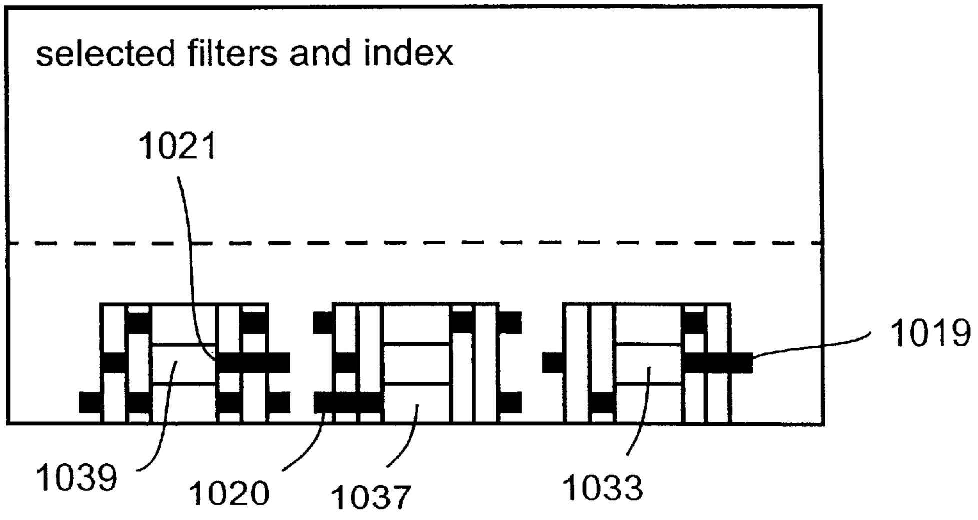

FIG. 2B illustrates the arrangement of the overlaid filter pages of FIG. 1D over the information pages of FIG. 2A in a fashion that provides for the selection of information from the information paces corresponding to the attributes and types shown in FIGS. 1A to 1C. As seen from FIG. 2B, the filter attributes 1019 enable selection of the tab 1033, the filter attributes 1020 enable selection of the tab 1037 and the filter attributes 1021 enable selection of the tab 1039. In this fashion, each of the pages corresponding to the tabs 1033, 1037 and 1039 includes information which corresponds to the combination of Attribute 1 Type 1, Attribute 2 Type 1, and Attribute 3 Type 1. As a consequence, a user of the document incorporating the pages 1000, 1015, 1010, 1030 is able to select individual items of information based upon the user's selection of particular filter attributes. In this fashion, the various indicators formed by the tabs 1004, 1012 and 1016 together with the indicators 1006, 1011 and 1017 enable the user to form a temporary hyperlink to particular information that satisfies user desired criteria.

Figures 3A, 3B:
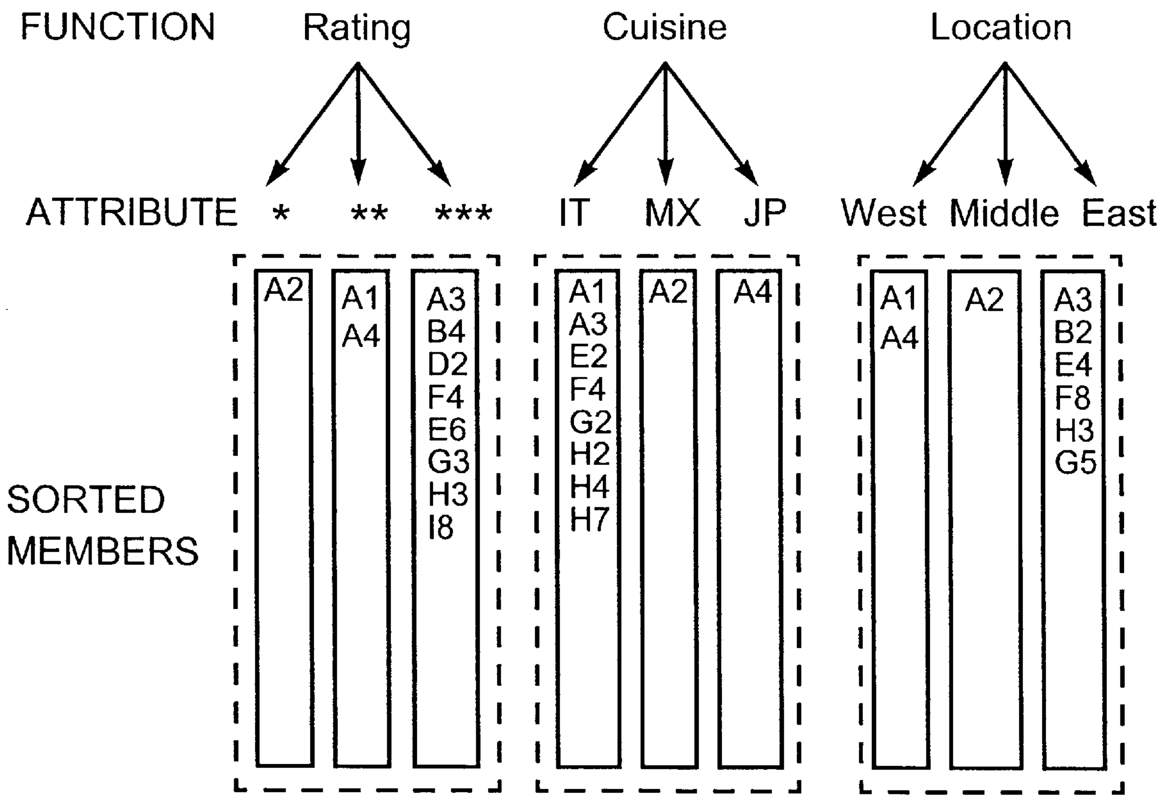
FIGS. 3A and 3B illustrate data sets associated with an example illustrating the preferred embodiment.

An embodiment of the present invention will now be described with reference to an Example, the salient features of which are illustrated in FIGS. 3A to 7C. The Example relates to a restaurant guide for a hypothetical township geographical divided into west, central and east portions and having each of one star, two star and three star restaurants. The restaurants are also grouped into Italian, Japanese or Mexican cuisine. As a consequence, and as illustrated in FIG. 3A, the restaurants located within the township are able to be sorted using one or more of three filter functions (cuisine, rating and location) with each function having three types, or attributes.

Figure 4:
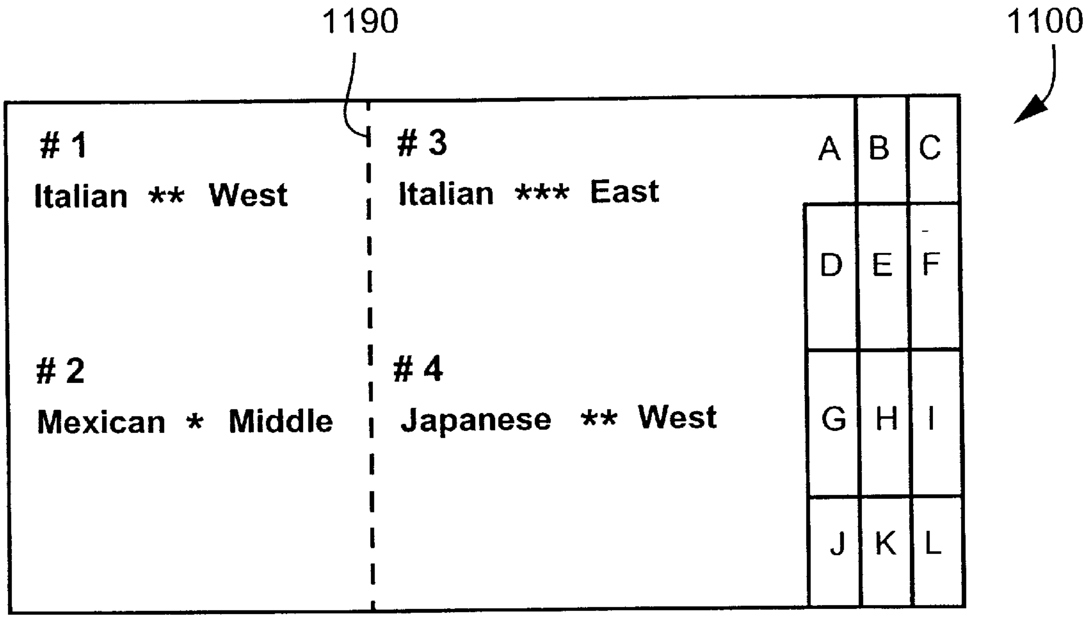
FIG. 4 illustrates a printed document incorporating the data of the Example of FIGS. 3A and 3B.

Typically, reviews of each of the restaurants located within the township, such as those often published in newspapers or magazines, provide text which allows for classification of each restaurant according to these various criteria. Using this information, a number of information pages 1100 shown in FIG. 4, may be formatted to provide the details of each restaurant. As seen in FIG. 4, information page A, as denoted by a corresponding tab, includes reviews of four restaurants appropriately indicated by a corresponding reference number and giving the general classification of each restaurant within the various filter criteria established in FIG. 3A. As seen in this Example, there are twelve information pages (A–L).

According to the preferred embodiment, the information contained in the information pages A to L is sorted according to each of the criteria. In this fashion, cuisine, rating and location form filter functions with the various attributes being used to determine sets of restaurants which meet each of the various criteria. This is seen in FIG. 3B where the various restaurants indicated in the information pages A to L are listed according to the filter function and filter attributes that are met. With three alternatives in each category, this gives nine separate sets of restaurants as illustrated.

Figure 5A:
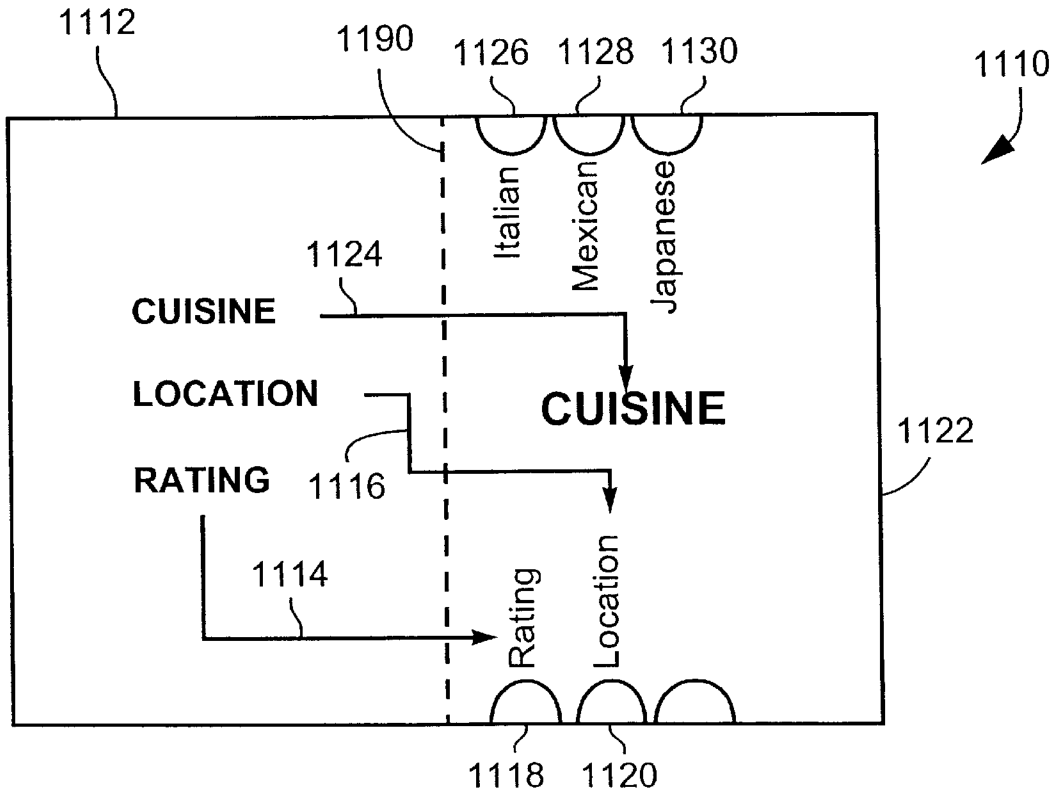
FIGS. 5A to 5C illustrate a first filtering process used in the Example.

Using the sorted members illustrated in FIG. 3B, a number of referencing pages of the document to be produced are created for each of the primary filter functions. The first of these is shown in FIG. 5A which shows a referencing page 1110 which includes a primary referencing portion 1112 which lists each of the three primary filter criteria of cuisine, location and rating. From each of those criteria, a printed hyperlink extends to a corresponding indicator for that criteria. In respect of rating and location, the corresponding printed indicators 1114 and 1116 refer to corresponding cutouts 1118 and 1120 formed on a secondary component 1122 of the page 1110. An indicator 1124 which points to cuisine on the page component 1122 provides a link to a number of cutouts 1126, 1128 and 1130 for each of Italian, Mexican and Japanese cuisine. In this fashion, a user of the document is able to select a page corresponding to the particular cuisine desired. At this stage, functionality represented in the Example corresponds to the functionality described in the cross-referenced disclosures.

In the Example being described, it is desired by the user to identify an Italian restaurant located in the east portion of the township and which has a three star rating. Accordingly, using the referencing page 1110, the user may then select the Italian cutout 1126 which then refers the user to a further referencing page 1132 seen in FIG. 5B. Particularly, in FIG. 5B, the referencing page 1132 is shown illustrated overlaying the information pages 1100. The referencing page 1132 is sized smaller than the information pages 1100 so as to not to obscure the tabs A to L of those pages. The referencing page 1132 includes a heading of "Italian", that corresponding to the selection desired by the user. It is desirable that the cutouts for both Mexican and Japanese cuisine 1128 and 1130 remain visible on the referencing page 1132 as are the rating and location cutouts 1118 and 1120 respectively. Also seen in FIG. 5B, is a reverse cutout tab 1134 which allows the user to retrace back to the cuisine selection page 1110.

The referencing page 1132 includes a foldable section 1136 incorporating three folded tabs 1138 which are configured, when unfolded, to overlay the tabs A to L of the information pages 1100. This is seen in FIG. 5C where the foldable section 1136 is seen unfolded along a fold line 1140 so that the tabs 1138 are positioned above the tabs A to L of the information pages 1100. The tabs 1138 incorporate a number of indicators 1142 arranged to identify a corresponding one of the tabs A to L indicating the location in the information pages 1100 of the description of an Italian restaurant. For example, two of the indicators 1142 identify information on page A which is that seen in FIG. 4. It is seen from FIG. 4 that two Italian restaurants are provided with reviews on page A, those restaurants residing at locations #1 and #3 corresponding to the position of the indicators 1142 on the corresponding tab 1138.

The next criteria desired for identifying a restaurant is that of rating. Using the page 1132 shown in FIG. 5C, the rating tab 1118 is selected which refers the user to a further referencing page 1144 seen in FIG. 6A. The referencing page 1144 incorporates cutouts 1146, 1148 and 1150 for each of the three "star" ratings provided. With this, the user is able to select the cutout of 1150 to identify three star restaurants within the township. By selecting the cutout 1150, the user is referred to a further referencing page 1152 shown in FIG. 6B, again overlaying the information pages 1100. As with previous referencing pages, reverse cutouts are provided to enable the user to return to previous reference pages. A cutout 1154 is provided to return to the rating page 1144 shown in FIG. 6A and cutouts 1156 and 1158 return to each of the one star and two star ratings pages (not shown) respectively.

Figure 5B:
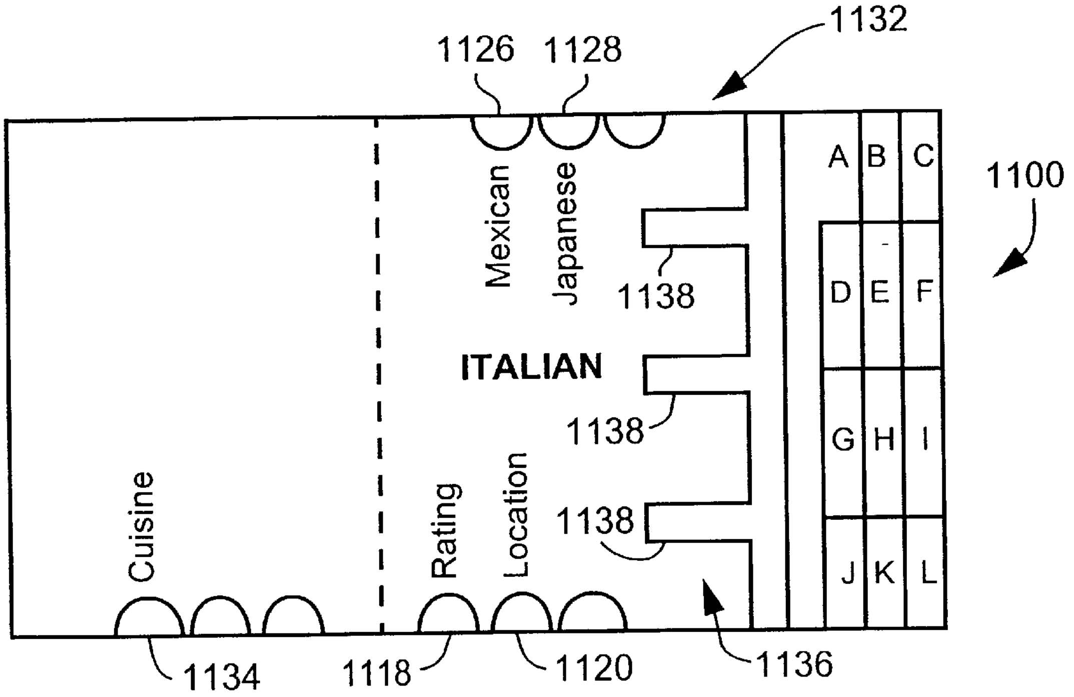
Figure 5C:
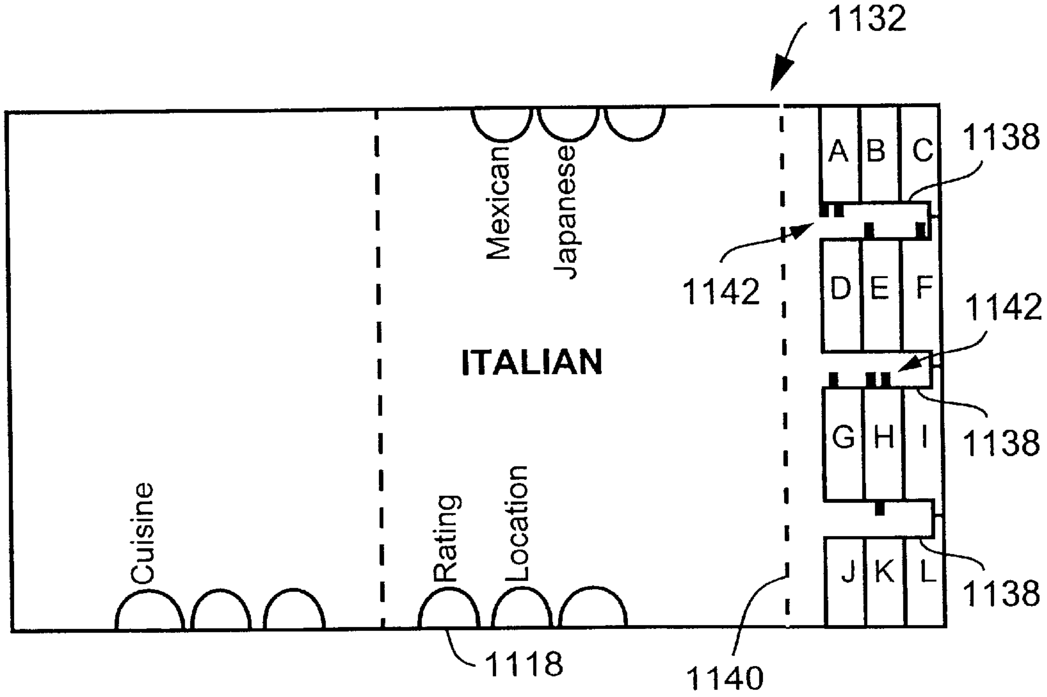
Figure 6A:
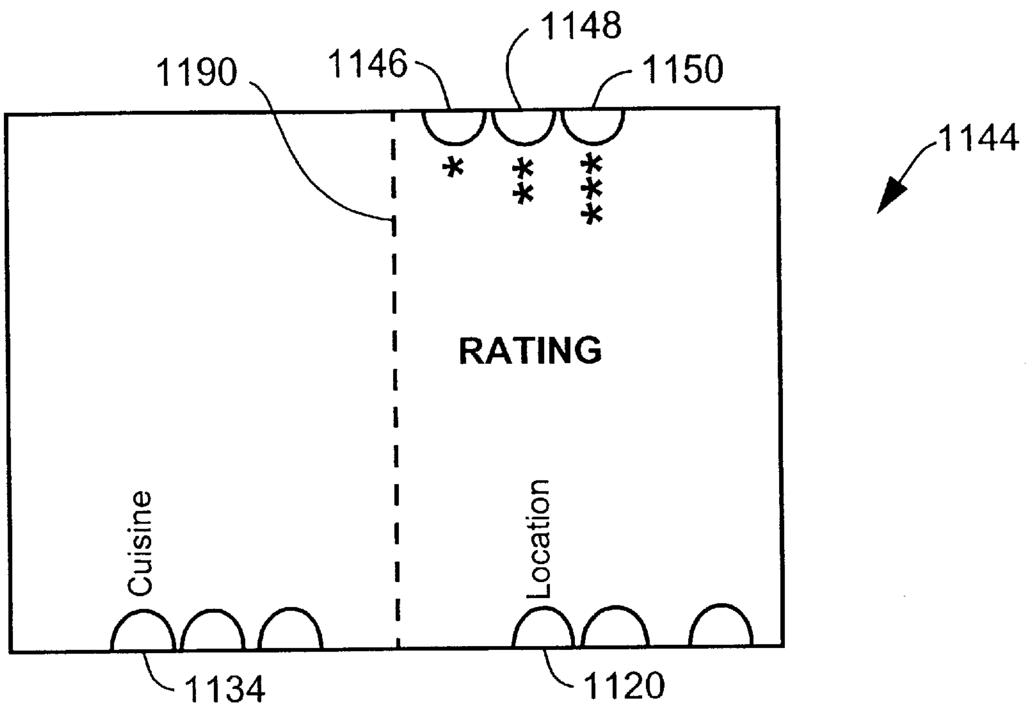
FIGS. 6A to 6B illustrate a second filtering process used with the Example.
Figure 6B:
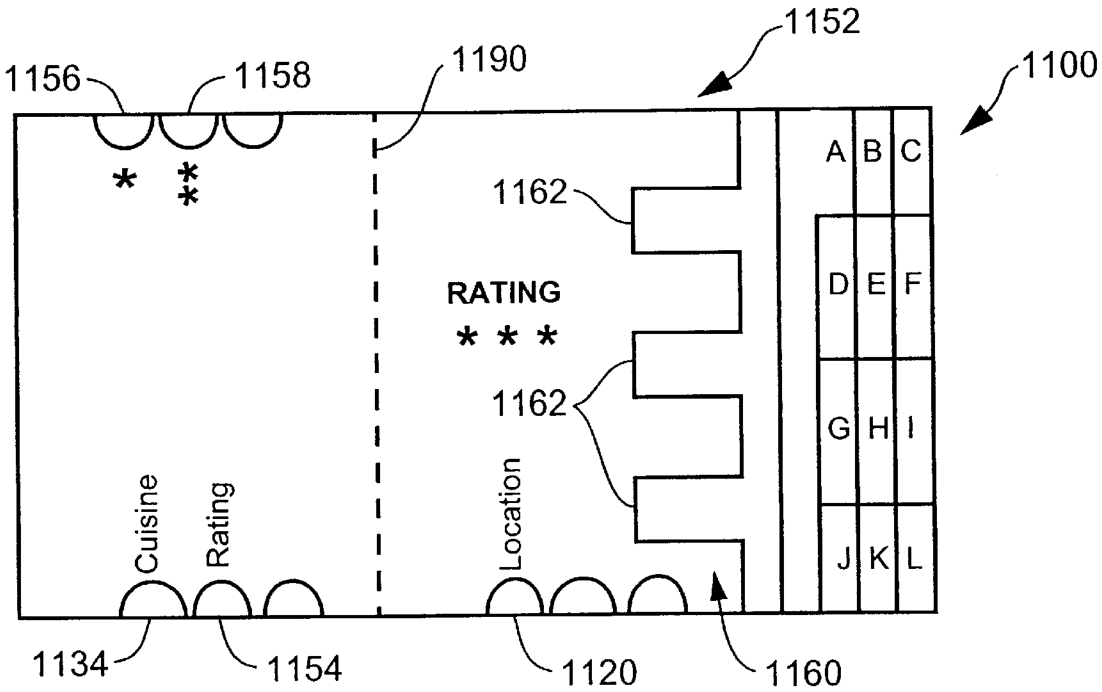
Figure 6C:
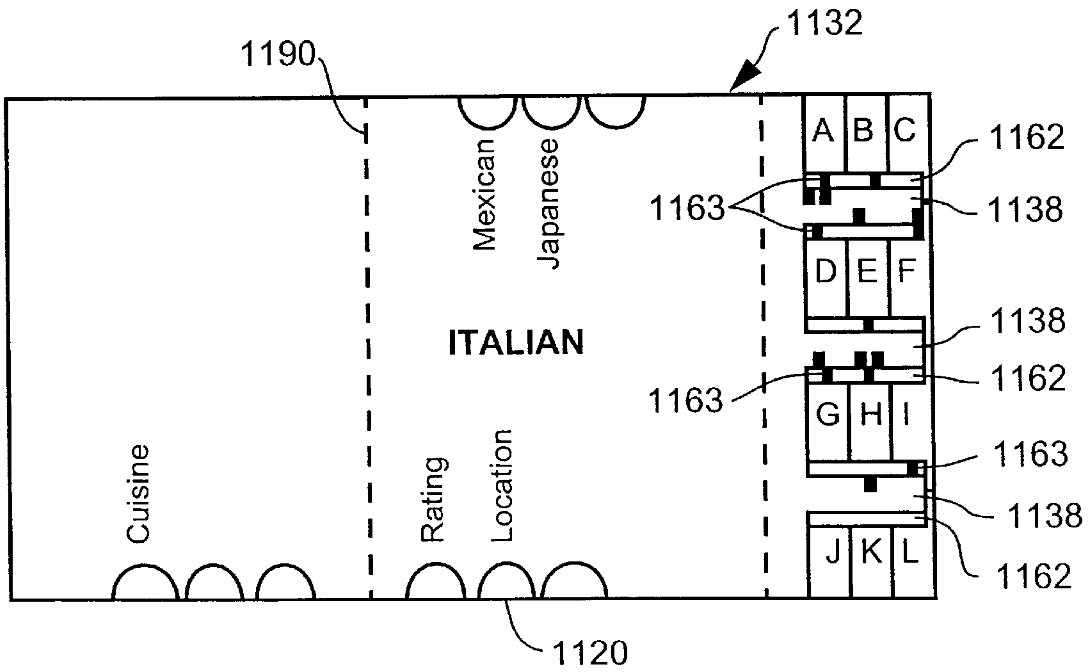

As with the arrangement of FIG. 5B, the referencing page 1152 of FIG. 6B also includes a foldable section 1160 incorporating tabs 1162. The tabs 1162 arc able to be folded over the tabs A to L of the information pages 1100 to reveal those restaurants within the township which incorporate a three start rating. FIG. 6C shows this arrangement of the tabs 1162 folded into such position with the overlay of the cuisine tabs 1138 in a fashion corresponding to FIG. 5C. As a consequence, at this stage the user in order to see these two overlaying sets of tabs, must view the Italian referencing page 1132. As seen from FIG. 6C, a number of restaurants identified by indicators 1163 incorporate a three star rating, those being restaurants A3, B4, D2, F4, E6, G3, H3, and 18. These are clearly seen to correspond with the assorted members of the three star group shown in FIG. 3B.

From the arrangement of FIG. 6C, the user may then select the third (and final) criteria, that being location, and this is performed by accessing the cutout 1120. The selection of the Cutout 1120 reveals a referencing page 1164 shown in FIG. 7A. The referencing page 1164 includes a map 1166 representative of the location of each of west, middle and east within the township and provides cutouts 1168, 1170 and 1172 so that the user may select a corresponding location. In this fashion, the user may select the cutout 1168 to refer to those restaurants within the cast portion of the township and such action refers the user to a further referencing page 1174 seen in FIG. 7B, again overlaying the information pages 1100. The referencing page 1174 like before, includes a foldable section 1176 including tabs 1178 able to be folded to overlay the tabs A to L of the information pages 1100.

Figure 7A:
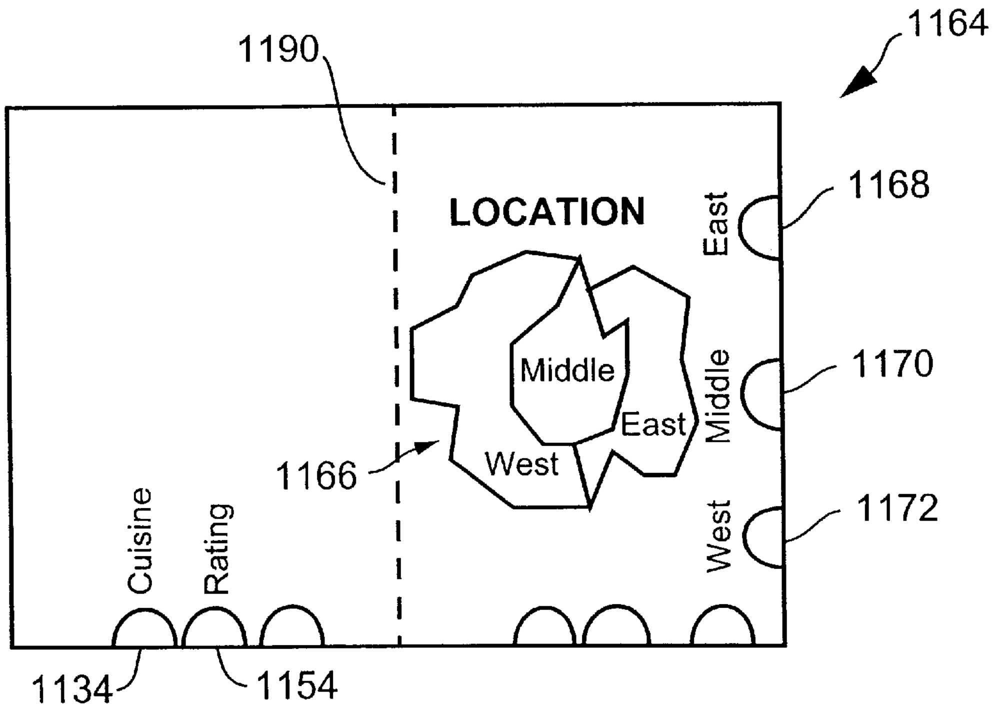
FIGS. 7A to 6C illustrate a third and final filtering process of the Example.
Figure 7B:
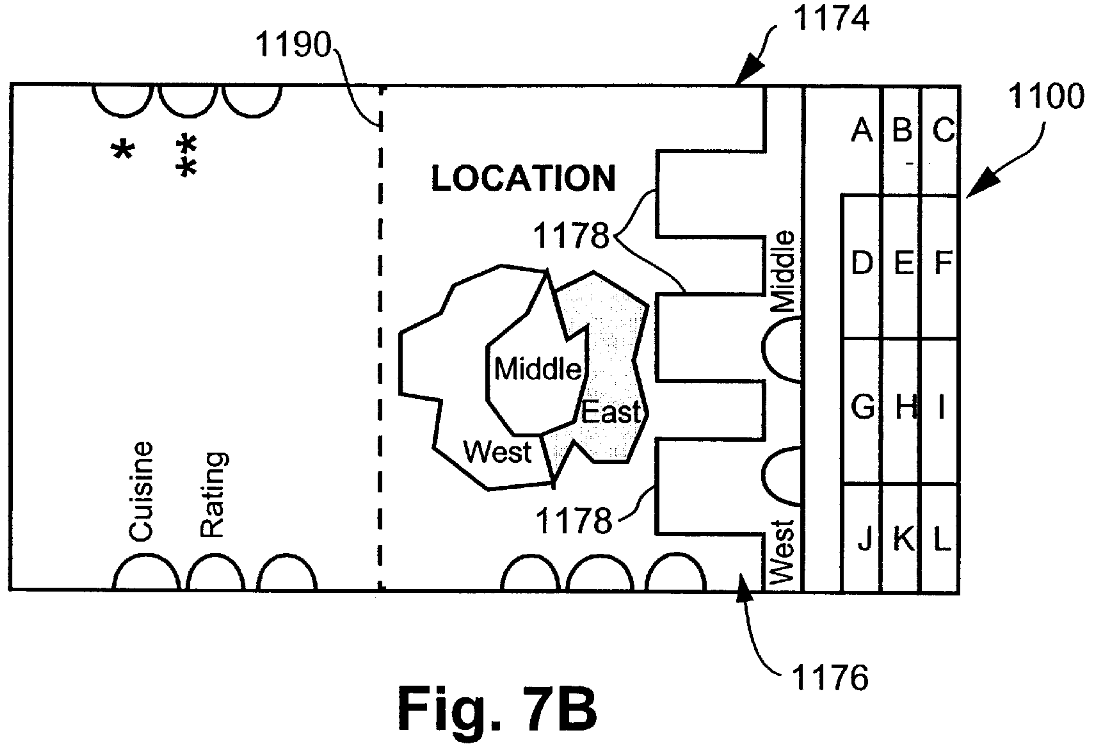
Figure 7C:
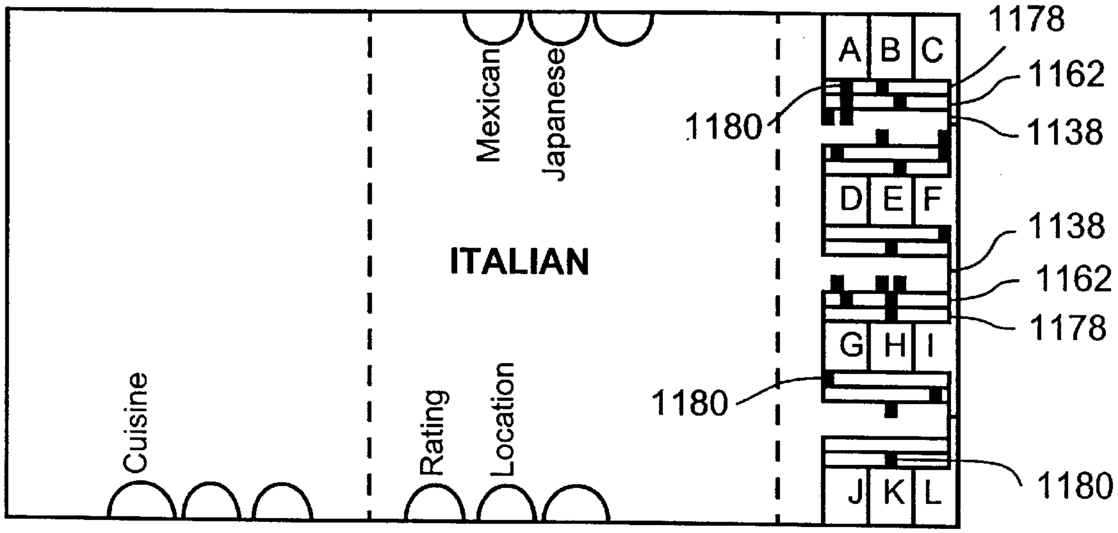

FIG. 7C shows a view similar to that of FIGS. 6C and 5C where the tabs 1178 have been laid over the tabs A to L of the information pages 1100. As before, indicators 1180 are provided to indicate those restaurants located in the east part of the township. The combination of the indicators 1142, 1163 and 1180 provide a means by which the user may visually and readily identify those restaurants which meet each of the three selected criteria. From FIG. 7C, it is immediately apparent that a restaurant identified at location A3 meets each of the three criteria. A restaurant identified at location F4 meets two of the three criteria, as does a restaurant arranged at location H3. As a consequence, the user is able to identify the restaurant at location A3 as being an Italian restaurant of three star rating located in the east part of the township. This is readily seen also from FIG. 4 where location three identifies such a restaurant.

In this fashion, the various indicators provided on the foldout portions of the referencing pages provide a means by which a user may form a temporary and substantially user defined, hyperlink to identify specific data items from the information pages.

In the above example, it is noted that the referencing pages shown in FIGS. 5A, 6A and 7A are shown isolated and without being overlaid the information pages 1100. In practice, the various referencing pages are stacked one upon the other on top of the information pages 110 to form a book or booklet preferably which incorporates a substantially central fold 1190 shown on each of those pages. This enables the pages to be combined to present a means by which pages may be easily turned, referenced, and where appropriate, the foldout tabs overlaid over tabs A to L to identify an appropriate restaurant. It will be further appreciated that certain referencing pages have not been described since such are not essential to the particular example of a three star Italian restaurant in the east of the township. However, it will be appreciated from FIG. 3B that a primary referencing page may be provided for each of the primary filter function, cuisine, rating and location, and these are seen FIGS. 5A, 6A and 7A, and that further referencing pages may be provided for each of the attributes within those filter functions. Thus, in one implementation of this example, the total of twelve referencing pages may be required to overlay the twelve information pages 1100. However, as will be appreciated by those skilled in the art, depending upon the level to which physical and printed references may be incorporated onto any one or more pages, the number of referencing pages may be reduced where appropriate, provided functionality is maintained. This particularly applies to referencing pages based upon fundamental filter functions and/or non-terminal attributes. For example, a real estate guide may have fundamental filter functions such as price, location and property type. Property type may have non-terminal attributes of commercial and residential each with terminal attributes of factory and shop, and, apartment and cottage, respectively. In such a situation, a referencing page including printed indicia maybe sufficient to accommodate the property types together with commercial and residential filters. Advantageously, terminal attributes are unique to a page to permit ready combining of different filter criteria. Alternatively, different attributes may be differently coloured or indicated by distinctive symbology.

Figure 8:
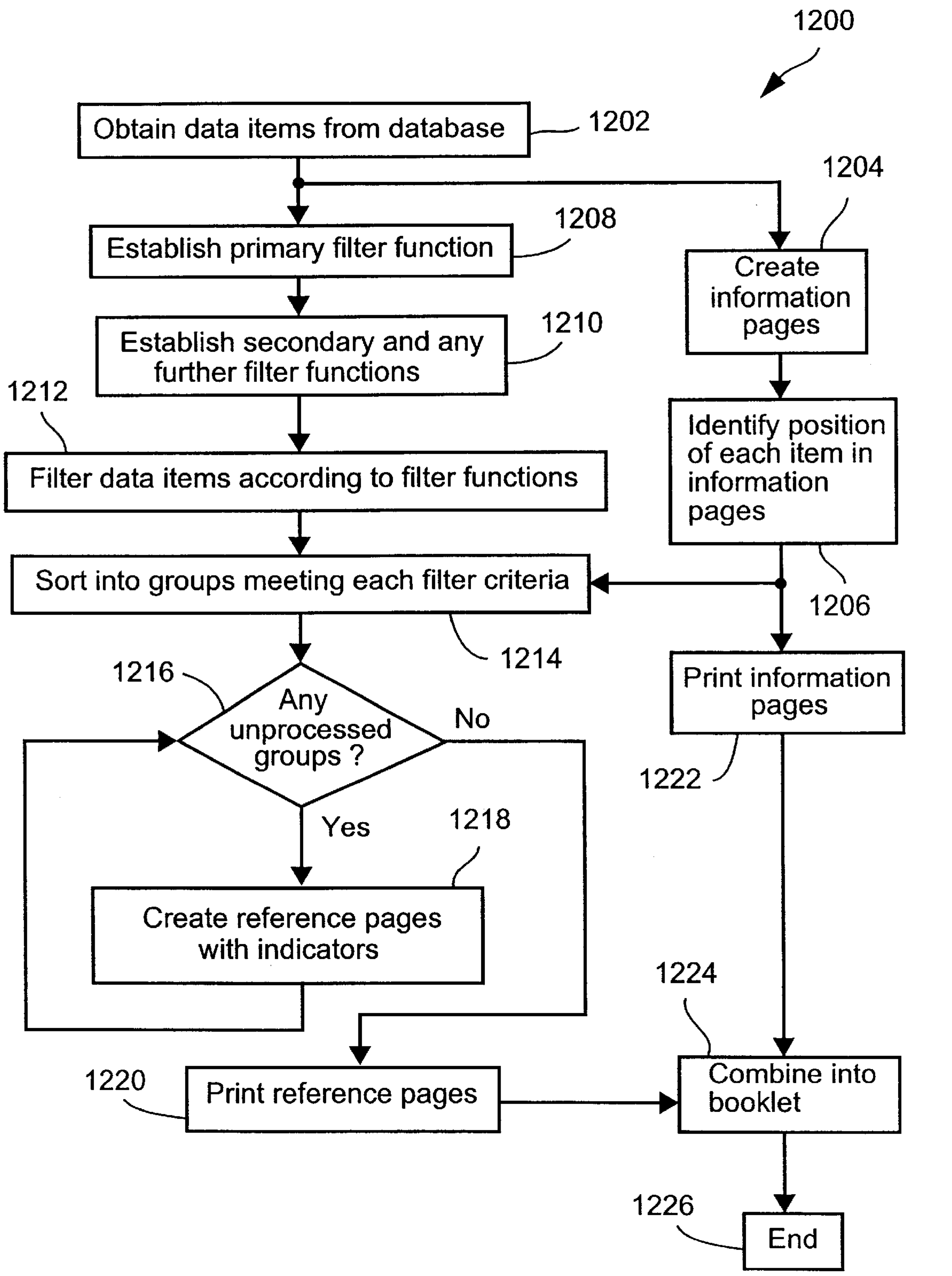
FIG. 8 is a schematic flow chart illustrating the method performed in the preferred embodiment.

FIG. 8 shows a general method 1200 for forming a document according to the preferred embodiment. Initially, at step 1202, individual items which may be desired to be identified are extracted or obtained from database. At step 1204, one or more printable information pages of the document to be produced incorporating tabs, cut-outs or other selectable indicia are formed using the various items extracted from the database. At step 1206, the position of each individual item of information within the information pages is identified. The information pages may then be printed and cut (where appropriate) at step 1222.

Also following from step 1202, step 1208 establishes at least two primary filter functions for sorting or searching the data items within the information pages. Step 1210 establishes at least two secondary filter functions and any further subsidiary filter functions. At step 1212, each of the data items arc filtered according to each combination of the various filter functions identified in steps 1208 and 1210. At step 1214, the various filtered data items are sorted into groups corresponding to each combination of filter criteria. Step 1216 commences a recursive loop which examines each unprocessed group and via step 1218 creates referencing pages with indicators that enable pointing to the data items in the information page. When all groups have been processed, step 1220 follows which prints the various pages and forms them with appropriate cutouts and tabs as required. Step 1244 acts to combine the reference pages with the information pages from step 1222 to provide the completed booklet. Processing ends at step 1226.

Depending on the manner in which the information pages are configured, it may not be necessary to include foldout sections and/or tabs on the referencing pages. For example, if in FIG. 4, only information pages A, D, G and J were used, foldout tabs would not be necessary and printed markers only may be used. Further, the width of pages may be adjusted to achieve the layering effect seen in FIGS. 1D and 7C for example.

Figure 9:
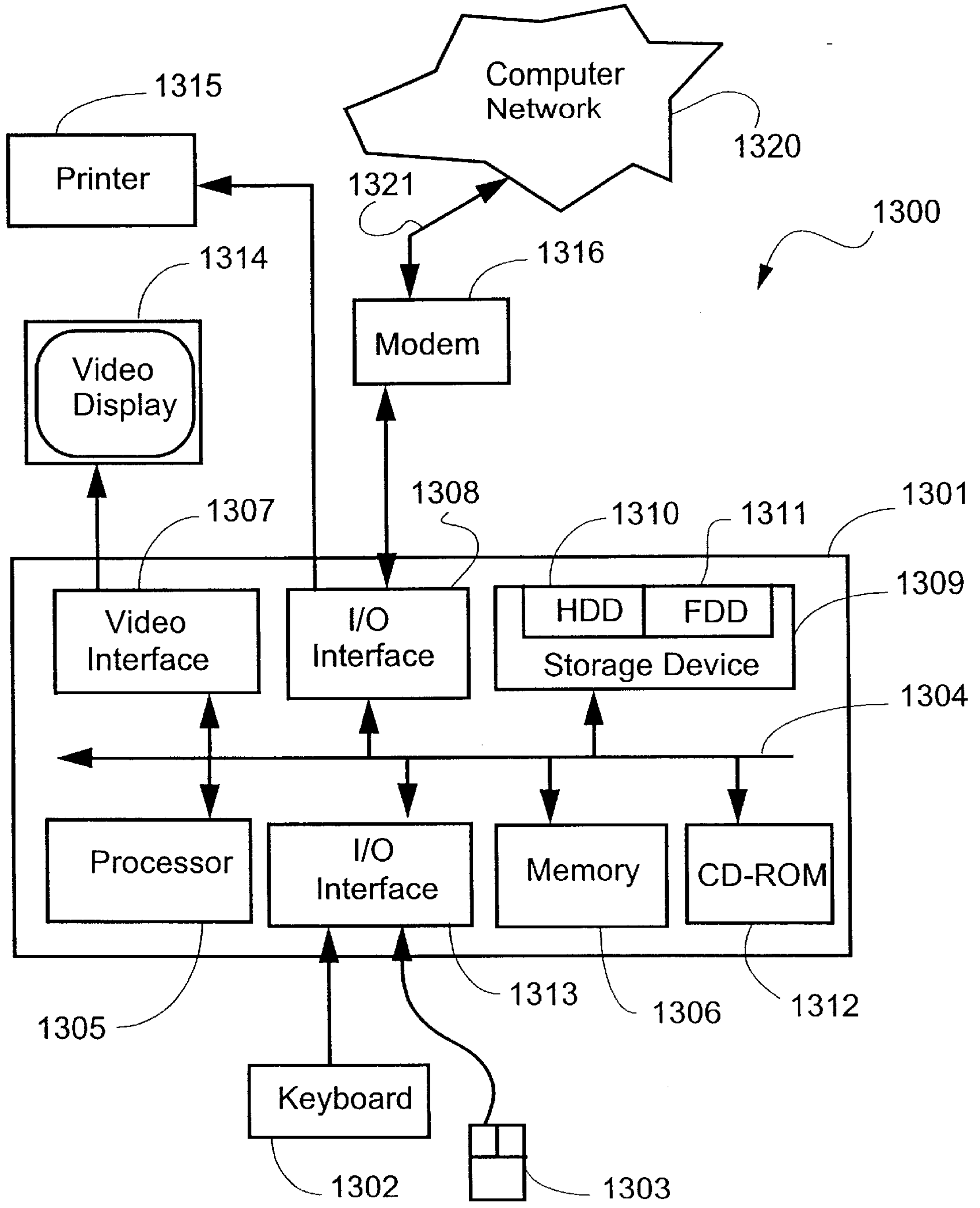
FIG. 9 is a schematic block diagram representation of a general purpose computer which the preferred embodiment may be performed.

As with the arrangements described in the cross-referenced disclosures, the preferred embodiments are preferably implemented as software operable on a computing system incorporating appropriate printing and cutting equipment. The method of FIG. 8 is preferably practiced using a conventional general-purpose computer system 1300, such as that shown in FIG. 9 wherein the processes described above may be implemented as software, such as an application program executing within the computer system 1300. In particular, the steps of method of FIG. 8 are effected by instructions in the software that are carried out by the computer. The software may be divided into two separate parts; one part for carrying out the database referencing methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for printed document production in accordance with the embodiments of the invention.

The computer system 1300 comprises a computer module 1301, input devices such as a keyboard 1302 and mouse 1303, output devices including a printer 1315 and a display device 1314. The printer 1315 may be a device incorporating both printing and cutting functions thereby enabling the formation of the various cutouts and tabs used in a number of embodiments. A Modulator-Demodulator (Modem) transceiver device 1316 is used by the computer module 1301 for communicating to and from a communications network 1320, for example connectable via a telephone line 1321 or other functional medium. The modem 1316 can be used to obtain access to the Internet, and other network systems, such as a Local Area Network (LAN) or a Wide Area Network (WAN) which may act as an electronic source of information to be printed.

The computer module 1301 typically includes at least one processor unit 1305, a memory unit 1306, for example formed from semiconductor random access memory (RAM) and read only memory (ROM), input/output (I/O) interfaces including a video interface 1307, and an I/O interface 1313 for the keyboard 1302 and mouse 1303 and optionally a joystick (not illustrated), and an interface 1308 for the modem 1316. A storage device 1309 is provided and typically includes a hard disk drive 1310 and a floppy disk drive 1311. A magnetic tape drive (not illustrated) may also be used. A CDROM drive 1312 is typically provided as a non-volatile source of data The components 1305 to 1313 of the computer module 1301, typically communicate via an interconnected bus 1304 and in a manner which results in a conventional mode of operation of the computer system 1300 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 1310 and read and controlled in its execution by the processor 1305. Intermediate storage of the program and any data fetched from the network 1320 may be accomplished using the semiconductor memory 1306, possibly in concert with the hard disk drive 1310. In some instances, the application program may be supplied to the user encoded on a CD-ROM or floppy disk and read via the corresponding drive 1312 or 1311, or alternatively may be read by the user from the network 1320 via the modern device 1316. Still further, the software can also be loaded into the computer system 1300 from other computer readable medium including magnetic tape, a ROM or integrated circuit, a magneto-optical disk, a radio or infra-red transmission channel between the computer module 1301 and another device, a computer readable card such as a PCMCIA card, and the Internet and Intranets including e-mail transmissions and information recorded on Websites and the like. The foregoing is merely exemplary of relevant computer readable mediums. Other computer readable mediums may be practiced without departing from the scope and spirit of the invention.

The method of FIG. 8 may alternatively be implemented in dedicated hardware such as one or more integrated circuits performing the functions or sub functions of document production. Such dedicated hardware may include graphic processors, digital signal processors, or one or more microprocessors and associated memories.

Industrial Applicability

The present invention finds application in situations where printable documents are desired over electronic arrangements for convenience and/or ease of manufacture and cost. Any number of filter criteria and attributes may be used, but it will be appreciated from the foregoing, that at least two primary criteria and at least two subsidiary attributes are necessary in order to achieve the benefits of using the arrangement disclosed herein compared with other arrangements, where such exists that do not rely upon filtering of appropriate criteria to form physical referential links between information.

The foregoing describes only one embodiment of the present invention, and modifications can be made thereto without departing from the spirit or scope of the present invention.

What is claimed is:

1. A method of forming a printable document from a database having a plurality of data records, the printable document incorporating manual functionality complementing electronic functionality associated with said database, said method comprising the steps of:

filtering said database using a plurality of filter functions, each said filter function having a plurality of filter attributes, said filtering forming, for each said filter attribute, a corresponding set of said data records;

creating at least one information page, each said information page incorporating at least one data element related to at least one of said data records, there being associated with each said data element a corresponding (first) physical indicator selectable by a user of said document to access the corresponding data element;

creating at least one referencing page, each said referencing page incorporating for each said filter function a first set of (second) physical indicators selectable by said user to access one said referencing page corresponding to at least one other of said filter functions, a second set of (third) physical indicators selectable by said user to access information regarding each corresponding said attribute of said filter function; and a third set of (fourth) physical indicators configurable in association with said first physical indicators for directly referencing the corresponding said data element; and combining said information pages and said referencing pages to form said printable document.

2. A method according to claim 1, wherein associated with each said filter function is a corresponding said referencing page.

3. A method according to claim 1, wherein associated with each said filter attribute is a corresponding referencing page.

4. A method according to claim 1, wherein filter criteria is determined by said plurality of filter functions comprising a plurality of non-terminal filter attributes and a plurality of terminal filter attributes, and wherein an individual said referencing page is associated with a corresponding one of each said terminal filter attributes.

5. A method according to claim 1, wherein said third set of fourth physical indicators are configured to be located adjacent a corresponding data element within said information pages.

6. A method according to claim 5, wherein said third set of fourth physical indicators comprises a plurality of tabs configured to be laid over said information pages such that corresponding fourth and first indicators are at least adjacent each other.

7. A method according to claim 6, wherein said third set of fourth physical indicators comprises printed identifiers arranged on said tabs.

8. A method according to claim 5, wherein said third set of indicators comprises indicia printed onto corresponding said referencing pages.

9. A method according to claim 1, wherein selection of third indicators associated with one attribute of one said filter function acts to remove from operation third indicators associated with other attributes of said one filter function.

10. A method according to claim 1, comprising the further step of printing each said information page and each said referencing page.

11. A method according to claim 10, wherein said combining is performed after said printing.

12. A method according to claim 10, wherein said combining is performed before said printing.

13. A method of forming a transient hyperlink in a printed document, said printed document being formed from applying a plurality of filter functions, each having a plurality of filter attributes, to a plurality of data records to form, for each said attribute, a corresponding set of said data records, said printed document comprising at least one information page, each said information page incorporating at least one data element related to at least one of said plurality of data records, there being associated with each said data element a corresponding (first) physical indicator selectable by a user of said document to access the corresponding data element;

at least one referencing page, each said referencing page incorporating for each said filter function a first set of (second) physical indicators selectable by said user to access one said referencing page corresponding to at least one other of said filter functions, a second set of (third) physical indicators selectable by said user to access information regarding each corresponding said attribute of said filter function; and a third set of (fourth) physical indicators configurable in association with said first physical indicators for directly referencing the corresponding said data element;

said method comprising the steps of:

(i) selecting one said second physical indicator of a first said referencing page to access a corresponding further said referencing page of said document; and (ii) selecting from said further referencing page a third physical indicator and associating said third physical indicator with an adjacent first physical indicator to identify a corresponding said data record.

14. A method according to claim 13 wherein interposed between steps (i) and (ii) is the further step of:

(a) selecting from said further referencing page a (further) second physical indicator to access a corresponding further further said referencing page;

wherein the selection of step (ii) is from said further further referencing page.

15. Apparatus for forming a printable document from a database having a plurality of data records, the printable document incorporating manual functionality complementing electronic functionality associated with said database, said apparatus comprising:

means for filtering said database using a plurality of filter functions, each said filter function having a plurality of filter attributes, said filtering forming, for each said filter attribute, a corresponding set of said data records;

means for creating at least one information page, each said information page incorporating at least one data element related to at least one of said data records, there being associated with each said data element a corresponding (first) physical indicator selectable by a user of said document to access the corresponding data element, means for creating at least one referencing page, each said referencing page incorporating for each said filter function a first set of (second) physical indicators selectable by said user to access one said referencing page corresponding to at least one other of said filter functions, a second set of (third) physical indicators selectable by said user to access information regarding each corresponding said attribute of said filter function; and a third set of (fourth) physical indicators configurable in association with said first physical indicators for directly referencing the corresponding said data element; and means for combining said information pages and said referencing pages to form said printable document.

16. Apparatus according to claim 15, wherein associated with each said filter function is a corresponding said referencing page.

17. Apparatus according to claim 15, wherein associated with each said filter attribute is a corresponding said referencing page.

18. Apparatus according to claim 15, wherein filter criteria are determined by said plurality of filter functions comprising a plurality of non-terminal filter attributes and a plurality of terminal filter attributes, and wherein an individual said referencing page is associated with a corresponding one of each said terminal filter attributes.

19. Apparatus according to claim 15, wherein said third set of fourth physical indicators are configured to be located adjacent a corresponding data element within said information pages.

20. Apparatus according to claim 19, wherein said third set of fourth physical indicators comprises a plurality of tabs configured to be laid over said information pages such that corresponding fourth and first indicators are at least adjacent each other.

21. Apparatus according to claim 20, wherein said third set of fourth physical indicators comprises printed identifiers arranged on said tabs.

22. Apparatus according to claim 19, wherein said third set of indicators comprises indicia printed onto corresponding said referencing pages.

23. Apparatus according to claim 15, wherein selection of third indicators associated with one attribute of one said filter function acts to remove from operation third indicators associated with other attributes of said one filter function.

24. Apparatus according to claim 15, further comprising means for printing each said information page and each said referencing page.

25. Apparatus according to claim 24, wherein said means for combining operates after said means for printing.

26. Apparatus according to claim 24, wherein said means for combining operates before said means for printing.

27. A printed document for forming a transient hyperlink, said printed document being formed from applying a plurality of filter functions, each having a plurality of filter attributes, to a plurality of data records to form, for each said attribute, a corresponding set of said data records, said printed document comprising:

at least one information page, each said information page incorporating at least one data element related to at least one of said plurality of data records, there being associated with each said data element a corresponding (first) physical indicator selectable by a user of said document to access the corresponding data clement; and at least one referencing page, each said referencing page incorporating for each said filter function a first set of (second) physical indicators selectable by said user to access one said referencing page corresponding to at least one other of said filter functions, a second set of (third) physical indicators selectable by said user to access information regarding each corresponding said attribute of said filter function; and a third set of (fourth) physical indicators configurable in association with said first physical indicators for directly referencing the corresponding said data element.

28. A computer readable medium comprising a computer program product for forming a printable document from a database having a plurality of data records, the printable document incorporating manual functionality complementing electronic functionality associated with said database, said computer program product comprising:

means for filtering said database using a plurality of filter functions, each said filter function having a plurality of filter attributes, said filtering forming, for each said filter attribute, a corresponding set of said data records;

means for creating at least one information page, each said information page incorporating at least one data element related to at least one of said data records, there being associated with each said data element a corresponding (first) physical indicator selectable by a user of said document to access the corresponding data element;

means for creating at least one referencing page, each said referencing page incorporating for each said filter function a first set of (second) physical indicators selectable by said user to access one said referencing page corresponding to at least one other of said filter functions, a second set of (third) physical indicators selectable by said user to access information regarding each corresponding said attribute of said filter function; and a third set of (fourth) physical indicators configurable in association with said first physical indicators for directly referencing the corresponding said data element; and means for combining said information pages and said referencing pages to form said printable document.

29. A computer readable medium to claim 28, wherein associated with each said filter function is a corresponding said referencing page.

30. A computer readable medium to claim 28, wherein associated with each said filter attribute is a corresponding said referencing page.

31. A computer readable medium according to claim 28, wherein filter criteria is determined by said plurality of filter functions comprising a plurality of non-terminal filter attributes and a plurality of terminal filter attributes, and wherein an individual said referencing page is associated with a corresponding one of each said terminal filter attributes.

32. A computer readable medium according to claim 28, wherein said third set of fourth physical indicators are configured to be located adjacent a corresponding data element within said information pages.

33. A computer readable medium according to claim 32, wherein said third set of fourth physical indicators comprises a plurality of tabs configured to be laid over said information pages such that corresponding fourth and first indicators are at least adjacent each other.

34. A computer readable medium according to claim 33, wherein said third set of fourth physical indicators comprises printed identifiers arranged on said tabs.

35. A computer readable medium according to claim 32, wherein said third set of indicators comprises indicia printed onto corresponding said reference pages.

36. A computer readable medium according to claim 28, wherein selection of third indicators associated with one attribute of one said filter function acts to remove from operation third indicators associated with other attributes of said one filter function.

37. A computer readable medium according to claim 28, further comprising means for printing each said information page and each said referencing page.

38. A computer readable medium according to claim 37, wherein said combining is performed after said printing.

39. A computer readable medium according to claim 37, wherein said combining is performed before said printing.

40. A printable document formed using the method of claim 1.

41. A document formed using the method of claim 1.

* * * * *

UNITED STATES PATENT AND TRADEMARK OFFICE
CERTIFICATE OF CORRECTION

PATENT NO. : 6,650,434 B1
DATED : November 18, 2003
INVENTOR(S) : Stephen Robert Bruce It is certified that error appears in the above-identified patent and that said Letters Patent is hereby corrected as shown below:

Title page,
Item [57], ABSTRACT,
Line 15, “the” should be deleted; and
Line 23, “the” (second occurrence) should be deleted.

Column 2,
Line 23, “said” (first occurrence) should read -- set --; and
Line 24, “comprising” should read -- comprising; --.

Column 6,
Line 49, “18.” should read -- I8. --.

Column 10,
Line 61, “claim 1” should read -- claim 1, --; and
Lines 64 and 66, “claim 10” should read -- claim 10, --.

Column 11,
Line 6, “comprising” should read -- comprising: --.
Line 32, “claim 13” should read -- claim 13, --.
Line 37, “if” should read -- is --; and
Line 55, “element,” should read -- element; --.

Column 12,
Line 10, “is” should read -- are --.
Line 33, “claim 15” should read -- claim 15, --.
Lines 37 and 39, “claim 24” should read -- claim 24, --.
Line 45, “said” (first occurrence) should read -- set --; and
Line 46, “comprising” should read -- comprising: --.

UNITED STATES PATENT AND TRADEMARK OFFICE

CERTIFICATE OF CORRECTION

PATENT NO. : 6,650,434 B1
DATED : November 18, 2003
INVENTOR(S) : Stephen Robert Bruce It is certified that error appears in the above-identified patent and that said Letters Patent is hereby corrected as shown below:

Column 13,
Lines 29 and 32, "medium" should read -- medium according --.

Column 14,
Line 26, "claim 28" should read -- claim 28, --; and
Lines 29 and 31, "claim 37" should read -- claim 37, --.

Signed and Sealed this

Sixth Day of July, 2004

JON W. DUDAS
*Acting Director of the United States Patent and Trademark Office*